UNITED STATES PATENT OFFICE.

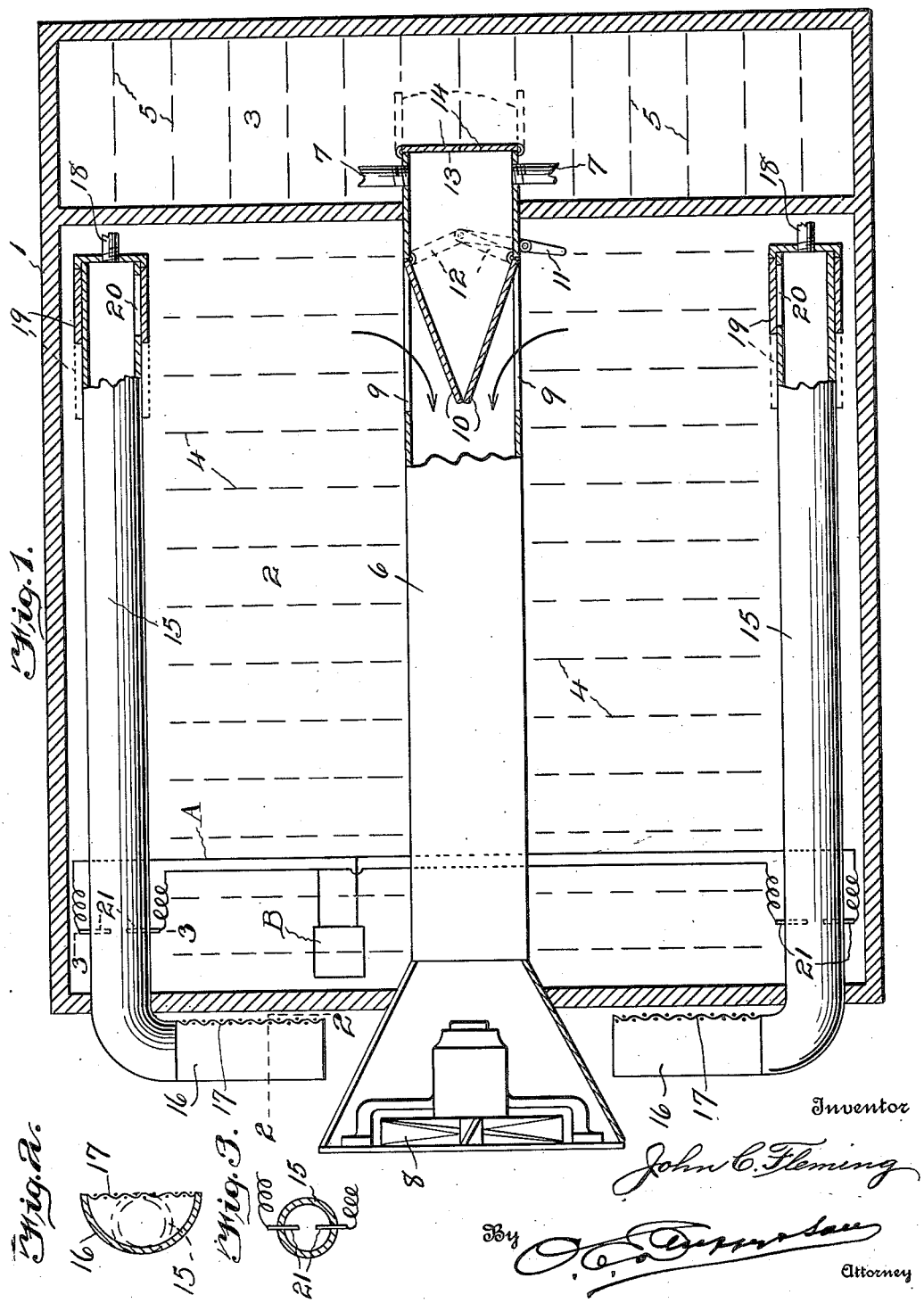

JOHN C. FLEMING, OF BOSTON, MASSACHUSETTS.

VENTILATING AND AIR-PURIFYING APPARATUS.

1,206,688. Specification of Letters Patent. Patented Nov. 28, 1916.

Application filed October 26, 1915. Serial No. 57,972.

*To all whom it may concern:*

Be it known that I, JOHN C. FLEMING, a citizen of the United States, residing at Boston, in the county of Suffolk and State of Massachusetts, have invented certain new and useful Improvements in Ventilating and Air-Purifying Apparatus; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to a system and apparatus for ventilating the interior compartments of buildings such as store houses, abattoirs, refrigerating plants and the like, and for supplying the same with highly purified air.

With this object in view the invention consists in the process and apparatus for withdrawing by mechanical means such as by suction, the heat, moisture, odors and impurities, existing in air arising from the presence of stored articles or materials such as freshly slaughtered animals or the like, and at the same time mantle and envelop such stored articles or material with electrified air to the compartment or compartments containing the same by atmospheric pressure, thus better fitting the stored articles such as freshly slaughtered animals or the like to receive a curing material to produce a food product in quality and food value of the highest order.

Referring to the accompanying drawing, Figure 1 is a horizontal sectional view illustrating a drying and a cooling compartment of an abattoir with ventilating and air purifying apparatus installed therein. Fig. 2 is a transverse sectional view through one of the air feeders taken on line 2—2 of Fig. 1 and Fig. 3 is a transverse sectional view through the same, taken on line 3—3 of Fig. 1.

Like numerals of reference indicate the same parts throughout the several figures in which:

1 indicates a building such as an abattoir in which 2 indicates a drying compartment and 3 a cooling compartment which two compartments are sufficient for a complete understanding of this invention. In the compartment 2, the dotted lines 4 indicate the positions of the racks on which freshly slaughtered animals are hung for drying preparatory to being transferred to the cooling room 3 in which 5 also indicates the position of the racks therein.

Entering the structure from the exterior thereof and as shown in the drawing, a suction flue 6 passes through the compartment 2 and enters the compartment 3, one or more connecting flues 7 being led from the main flue 6 to any desired point or other compartment or compartments in the building.

Disposed in the outer end of the flue 6 is a suction fan or blower 8 preferably electrically driven so as to produce within the flue 6 and connecting flues 7 a reduced pressure, so that air within the compartment 2 will be forced into the flue 6 through the openings 9 therein in the manner as indicated by arrows in Fig. 1. Said flue 6 is preferably square in cross section and has therein a pair of doors 10 commanding the ports or openings 9, said doors 10 being connected to a pivoted operating lever 11 by means of links 12, so that the doors may be swung into open position as shown in Fig. 1 or may be swung into position to close the ports or openings 9 in the flue 6.

Arranged on the end 13 of the flue 6 and acting as a closure therefor is a pair of doors 14 hung to swing into open or closed position as indicated in Fig. 1, said doors 14 opening into the compartment 3.

Disposed at each side of the compartment 2 are the air feeding flues 15 which open to the atmosphere and which are preferably provided with an enlarged end portion 16 having a screen 17 of fine mesh wire to prevent ingress of foreign particles to the flues 15 from the exterior of the structure.

Connecting with the flues 15 are the flues 18 which may lead to any point or compartment in the building, while on each flue 15 there is a slidable sleeve 19 commanding a port or opening 20 in the flue so that the same may be wholly or partially covered as desired.

Arranged in each flue 15 as shown in Figs. 1 and 3 is a pair of electrodes 21 arranged in an electric circuit preferably of high tension so as to continuously produce electric sparks at the points of the electrodes and within the air feeding flues 15.

Having thus described the several parts of this invention, its operation is as follows: It is the practice in the handling of freshly slaughtered animals in abattoirs to hang same in a drying compartment 2 in advance of their transfer to the cooling compartment 3. When it is desired to ventilate the drying compartment 2 and highly purify the air passing thereto, the doors in the flue 6, are set as shown in Fig. 1, the sleeves 19 in the flue 15 are moved into position as shown in dotted lines in Fig. 1, and the suction fan 8 is operated. This resultant suction action causes a reduction of pressure within the flue 6, and within the compartment 2 and pure atmospheric air is forced in by atmospheric pressure through the feed flues 15 to the compartment 2, said air passing through the flues 15 being subjected to the action of the electric sparks or arc at the electrodes 21, which is a powerful purifying agent and gives to the air entering the compartment 2 to envelop the freshly slaughtered animals a high quality as a destroyer of bacteria germs and other impurities remaining in the animals. The heat, moisture and odors within the compartments 2 are therefore withdrawn through the flue 6, and the air therein constantly replenished by highly purified atmospheric air.

As it is not desired to supply atmospheric air to the cooling compartment 3 directly from the external atmosphere owing to its effect upon the temperature within the cooling compartment 3, I extend the flue 6 only into the cooling compartment 3, and by opening the doors 14 in the end thereof and closing the doors, the compartment 3 is then under the influence of the suction fan 8 and by it a reduced pressure is created within the compartment 3 which besides freeing the same of moisture, odors and impurities tends also to lower the temperature therein by rarifying the atmosphere.

As will appear from Fig. 1 the electric circuit A is diagramatically illustrated in which B indicates a suitable source of current. Further reference to Fig. 1 shows that in the present embodiment of the invention, the doors 10 which command the openings 9 are so arranged that their ends engage each other when in an open position so as to form an internal closure within the flue shutting off communication between the inner end of the flue with the fan 8.

Having thus described the invention, it is apparent that the same is susceptible to certain changes in the construction and arrangement of the parts, and I consider myself clearly entitled to all such changes and modifications as fall within the limit and scope of the appended claims.

What I claim as new and desire to secure by Letters Patent of the United States is:

1. A ventilating and air-purifying apparatus for buildings, including a main air-discharge-flue having one end in communication with the outside-air and equipped with a suction-generating means, the other end of said flue being in communication with a compartment in the building, said flue being ported and having its ports in communication with a separate compartment, said flue also having closures for said ports, said inclosures, when in open position with respect to said ports, being adapted to close off the other end of said flue from the first referred to compartment, said flue having means for controlling communication therebetween and said first-referred to compartment, an air-supply flue in communication with the outside-air, and means for establishing communication between said air-supply flue and said separate or second compartment.

2. A ventilating and air purifying apparatus for buildings, including a main air discharge-flue having one end in communication with the outside air and equipped with a suction-generating means, the other end of said flue being in communication with a compartment in the building, means for controlling said communication, said flue being ported in opposite sides, the ports being in communication with a separate or second compartment and being controlled by oppositely hinged closures, said closures when in open position with respect to said ports, being adapted to meet or contact, within said flue, at their free ends, and close off the other end of said flue from the first-referred to compartment, a plurality of air-supply flues in communication with the outside air at their outer ends and provided at their inner ends with slidable sleeves controlling ports therein, said ports establishing communication between said plurality of air-supply flues and said separate or second compartment, and means for generating an electric spark within said plurality of air-supply flues.

In testimony whereof, I affix my signature, in presence of two witnesses.

JOHN C. FLEMING.

Witnesses:
C. HUGH DUFFY,
FLORENCE A. BARRON.